Oct. 27, 1936.  J. G. DEEGAN  2,058,420

PACKING RING CONSTRUCTION

Filed Feb. 17, 1934

INVENTOR
JOHN G. DEEGAN,

ATTORNEY

Patented Oct. 27, 1936

2,058,420

UNITED STATES PATENT OFFICE 2,058,420

PACKING RING CONSTRUCTION

John G. Deegan, New York, N. Y.

Application February 17, 1934, Serial No. 711,636

2 Claims. (Cl. 309—27)

My invention relates particularly to piston rings. One object is to provide a construction which can be readily manufactured and which will adapt itself to convenient installation and use.

One object is to provide a construction which will be resiliently seated in the rim of the piston and which will expand outwardly into the cylinder.

Another object is to provide a construction in which the expanding spring action longitudinally of the axis of the piston is independent of the outward radial or circumferential expansion in the cylinder.

Another object is to provide a construction in which the two spring actions may be independently varied or adjusted.

Another object is to provide a construction in which the longitudinal expansion against the side walls of the piston can be controlled and increased or decreased by simple changes in the basic construction.

Another object is to provide a construction of the foregoing character in which the rings are held snugly in position but are left free to float and adjust themselves to the piston groove and to the cylinder wall.

According to one form of the invention the piston ring construction includes two ring members adapted to fit within the usual groove of a piston. These ring members are themselves provided with grooves in one of which is located a circumferentially extending helical expanding spring which expands the rings against the inner cylinder wall. In the other grooves I mount a special spring member or curved springs which are connected by a single resilient band.

Figure 1:
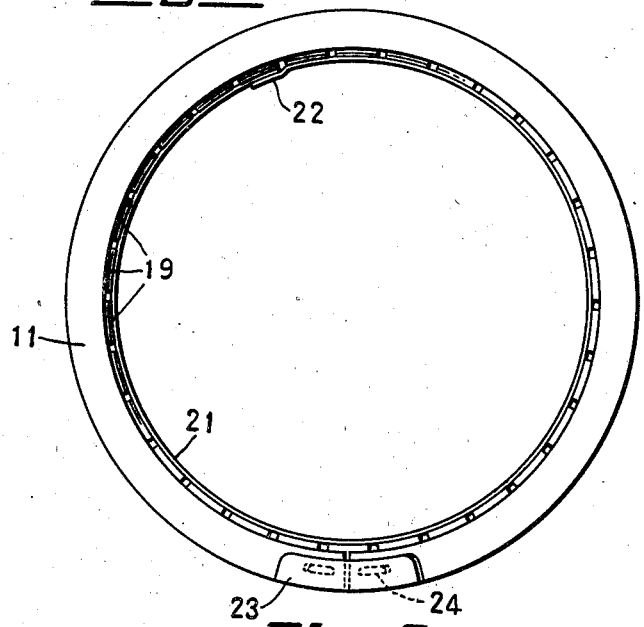
Fig. 1 is a plan view of one form of construction embodying my invention.
Figure 2:
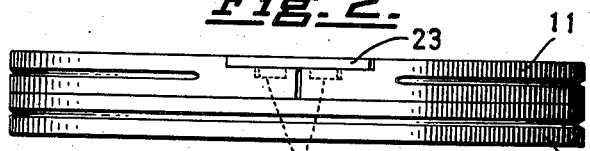
Fig. 2 is an edge view of the same.
Figure 3:
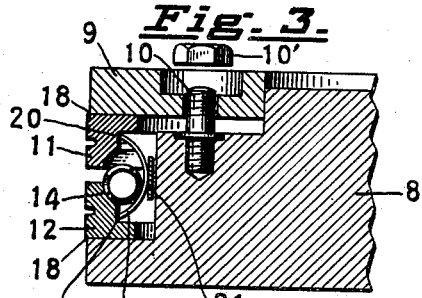
Fig. 3 is an enlarged sectional view of parts of a piston with the ring construction in place, the parts of the piston being shown separated.
Figure 5:
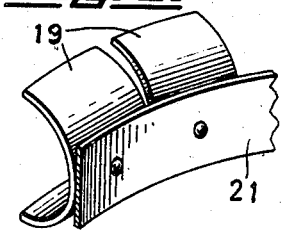
Fig. 5 is a perspective view of a fragment of the spring assembly which provides the expansibility longitudinally of the axis of the piston and against the side walls of the groove in the piston.
Figure 4:
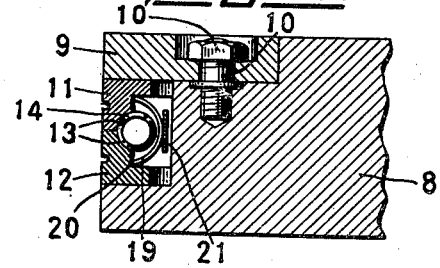
Fig. 4 is a view similar to Fig. 3 with parts of the piston being connected together.
Figure 6:
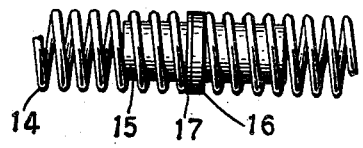
Fig. 6 is a fragmentary view of a part of the circumferentially expanding spring showing the junction between the two ends of the coil.
Figure 6:

The piston in the usual manner has a main part 8 and a detachable follower plate or junk ring 9 which are normally connected together by studs 10 and nuts 10'. A groove is formed between these parts in the usual manner to receive the rings 11 and 12 which may be circumferentially grooved, if desired, in the customary manner.

Each ring is provided with a curved groove 13 and the two combined form a seat for the expanding spring 14 which may be of suitable construction. Each groove 13 is preferably on an arc of 90° or somewhat less. The ends of this spring are adapted to be connected by a plug member 15 which extends into the adjacent ends of the coil and may have a flange 16 to hold it in place. This spring may be compressed more or less by adding or subtracting washers 17 on the plug 15.

The longitudinal expansion of the rings against the side walls 18, 18 of the groove in the piston is effected by a curved or arch-like spring member 19 whose ends or edges seat in grooves 20 in the respective rings. This spring member may be in one or more pieces. In the form shown springs 19 are integral with or riveted or otherwise secured to a band 21 which may itself be resilient and expansible to facilitate assembly and adjustment. The ends of the band 21 may be overlapped and secured together at 22 if desired.

These spring members 19 may be variously designed and any suitable number may be employed to provide the necessary expansible force so as to prevent leakage at the sides of the groove.

This side pressure, however, must not be great enough to interfere with the free floating action of the rings in the piston and yet the pressure must be sufficient to keep the rings in place against the adjacent walls when the piston moves sideways due to vibration, etc.

This side pressure can be adjusted by adding or removing units of the curved springs without affecting the pressure of the individual rings against the side walls. In case the spring members 19 are integral with the band 21 adjustment can be secured by altering the contour, height or number of the spring members.

In a properly designed piston ring construction the pressure outwardly and longitudinally should be nicely balanced so as to prevent the working fluid leaking behind the ring which would cause excessive pressure against the cylinder wall and result in excessive friction and wear on the ring and cylinder.

It will be understood that each piston ring may be of the split type and have a key or connecting member 23 let into recesses in the adjacent ends of the ring. This key member may have studs 24, 24 to fit into corresponding recesses in the ends of the ring so as to limit the expansion of the ring and so as to seal the joint or butt to prevent leakage to or around the back side of the rings.

The rings may be employed as packing in pumps and the like or in piston valves. In fact although the invention is primarily designed for use in steam pistons, it should be understood that the particular fluid employed is immaterial.

I claim:

1. A piston construction including two rings to be mounted in a groove in a piston, a circumferentially expansible and adjustable spring for pressing said rings outwardly against the inner side walls of a cylinder and a separate spring member for pressing the rings against the side walls of the groove and including an expansible band having a number of arched spring pieces with their free ends seated in the two rings.

2. A piston construction comprising a body portion having a groove, two split rings positioned in said groove alongside each other and provided with arcuate shaped grooves in the inner adjacent edges thereof and with circumferential inner grooves, a helical spring positioned in the space formed by said grooves for expanding said rings outwardly, an expansible band mounted in the piston groove behind the helical coil and separate arcuate shaped spring arms secured to said band and radiating therefrom and having their free ends seated in the inner circumferential grooves in the rings for lateral expansion thereof.

JOHN G. DEEGAN.